United States Patent [19]
Thomas et al.

[11] Patent Number: 6,141,393
[45] Date of Patent: Oct. 31, 2000

[54] METHOD AND DEVICE FOR CHANNEL ESTIMATION, EQUALIZATION, AND INTERFERENCE SUPPRESSION

[75] Inventors: Timothy A. Thomas, Palatine; Frederick W. Vook, Schaumburg; Kevin L. Baum, Rolling Meadows, all of Ill.

[73] Assignee: Motorola, Inc., Schaumburg, Ill.

[21] Appl. No.: 09/261,510

[22] Filed: Mar. 3, 1999

[51] Int. Cl.$^7$ .................................................. H04L 1/02
[52] U.S. Cl. ........................................ 375/347; 455/137
[58] Field of Search .................................. 375/229, 267, 375/347, 350, 316, 231; 455/63, 132, 137; 342/380

[56] References Cited

U.S. PATENT DOCUMENTS

| | | | |
|---|---|---|---|
| 5,047,859 | 9/1991 | Koo | 375/231 |
| 5,127,051 | 6/1992 | Chan et al. | 375/231 |
| 5,199,047 | 3/1993 | Koch | 375/231 |
| 5,231,648 | 7/1993 | Driedger et al. | 375/231 |
| 5,260,972 | 11/1993 | Wang | 375/231 |
| 5,471,501 | 11/1995 | Parr et al. | 375/232 |
| 5,581,580 | 12/1996 | Lindbom et al. | 375/377 |
| 5,583,886 | 12/1996 | Rohani et al. | 375/341 |
| 5,761,088 | 6/1998 | Hulylkar et al. | 375/231 |
| 5,771,439 | 6/1998 | Kennedy, Jr. et al. | 455/63 |
| 5,805,638 | 9/1998 | Liew | 375/231 |
| 5,828,658 | 10/1998 | Ottersten et al. | 370/329 |
| 5,933,421 | 8/1999 | Alamouti et al. | 370/330 |
| 5,982,327 | 11/1999 | Vook et al. | 342/380 |

FOREIGN PATENT DOCUMENTS 0 899 896 A1  11/1998  European Pat. Off. .......... H04B 7/08

*Primary Examiner*—Tesfaldet Bocure
*Attorney, Agent, or Firm*—Douglas D. Fekete

[57] ABSTRACT

A method and device in a communication system including a receiver having a plurality of receiving antennas for receiving a plurality of information bursts transmitted by at least one transmitting user device where the information bursts contain a number of data symbols and a pilot symbol sequence of content known at both the transmitting user device and the receiver. The method provides for computing a channel transfer function between the transmitting user device at each of the plurality of receiving antennas, by computing a simulated received pilot signal for each receiving antenna, computing an error signal between the simulated received pilot signal and the received pilot symbol sequence, computing a channel modeling sequence, wherein the power of the error signal is minimized, and computing the channel transfer function by weighting predetermined basis functions by the channel modeling sequence.

33 Claims, 9 Drawing Sheets

METHOD AND DEVICE FOR CHANNEL ESTIMATION, EQUALIZATION, AND INTERFERENCE SUPPRESSION

FIELD OF THE INVENTION

The present invention generally relates to the field of communication systems and more particularly, to estimating the frequency response of at least one desired signal received by at least one antenna, equalizing t he desired signals, while simultaneously suppressing interference.

BACKGROUND OF THE INVENTION

In a wireless communication system, a major design challenge is to maximize system capacity and performance in the presence of interference and multipath. Multipath propagation is caused by the transmitted signal reflecting off objects near the transmitter and receiver and arriving at the receiver over multiple paths. Interference in a communication system can come from a variety of sources depending on the particular system deployment. Interference and multipath are major factors that limit the achievable performance and capacity of a communication system because both effects interfere with the ability of a communication receiver to properly decode the transmitted data.

In a multipath propagation channel, the transmitted signal propagates to the receiver over a finite number P of propagation paths, where each path has an associated time delay and complex gain. In such a channel, the communication receiver receives the superposition of P delayed, attenuated, and phase-shifted copies of the transmitted signal. The number of paths P and their time delays and phase shifts depends on the physical location of the various scattering objects (such as buildings, automobiles, and trees) in the immediate vicinity of the transmitter and receiver. The complex attenuation (magnitude and phase) of each path depends on the length of each path as well as the material composition of any scatterers or reflectors encountered along the path.

The presence of multipath can severely distort the received signal. In a multipath environment, the multiple copies of the transmitted signal can interfere constructively in some portions of the occupied bandwidth. In other portions of the occupied bandwidth, the multiple copies can interfere destructively at the receiver. This interference causes unwanted variations in the received signal strength over the bandwidth occupied by the signal. Furthermore, if the difference in the path delays of the various propagation paths is significantly greater than the duration of a transmitted information symbol, then intersymbol interference is present at the receiver. When intersymbol interference is present, the received signal is corrupted by prior transmitted symbols propagating over paths having delays relative to the shortest path that are longer than the duration of an information symbol. The demodulation process (the process of determining which information symbol was transmitted) becomes difficult in the presence of intersymbol interference.

In addition to multipath, interference is another system component that limits the performance of a communication system. If the system is deployed in an unlicensed band, then interference can be generated by other users of the band. In a cellular system employing frequency reuse, co-channel interference can be generated by transmitters in another cell that is allocated the same set of frequency channels. Frequency reuse is the practice of assigning the same frequency channels to multiple users of the allocated spectrum.

Many cellular communication systems employ the technique of frequency reuse in order to maximize the utilization of the frequency spectrum allocated to a wide-area system deployment. In a cellular system, a large geographical area is divided into smaller regions called cells, where each cell is served by a single base station operating on an assigned set of frequency channels. Within each cell, multiple subscriber devices are allowed to communicate with the base station on the frequency channels assigned to that cell. The concept of frequency reuse involves allocating different sets of frequency channels to the cells belonging to a particular group and then reusing the same sets of frequencies to the cells belonging to another group of cells.

The reuse factor of a cellular system is defined to be the minimum distance between two cells that are allocated the same set of frequency channels divided by the radius of a cell. A cellular system employing a large reuse factor does not utilize the allocated spectrum as efficiently as a cellular system employing a smaller reuse factor. However, the level of co-channel interference received by a receiver in the cellular system is directly dependent on the reuse factor. Reducing the reuse factor tends to increase the level of co-channel interference experienced by a receiver. To better utilize the available spectrum, it would be advantageous to be able to suppress the effects of co-channel interference Thus, there is a need for a method and device for equalizing the desired signals, while simultaneously suppressing interference.

DETAILED DESCRIPTION OF A PREFERRED EMBODIMENT

Figure 1:
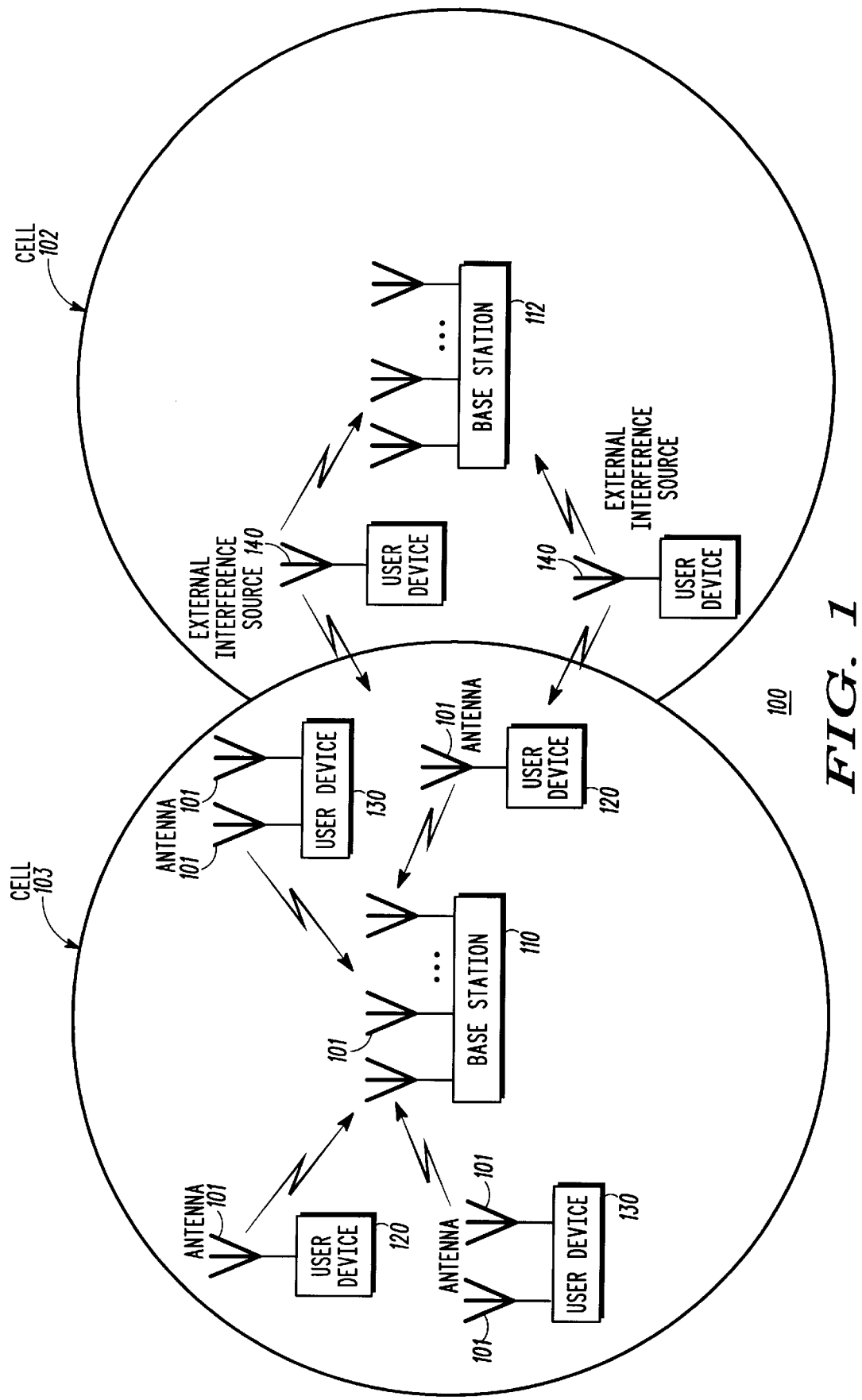
FIG. 1 is an overview diagram of a preferred embodiment of a cellular communication system in accordance with the present invention.

State of the art communication receivers can employ a variety of techniques for overcoming the effects of multipath and interference. Equalization is a technique for overcoming the deleterious effects of multipath. While being an effective tool for mitigating multipath, however, an equalizer by itself generally cannot suppress interference. To suppress interference, it is proposed to add an adaptive antenna array to the communication receiver.

An adaptive antenna array is an array of antennas connected to a communications receiver and operates by combining the signals received by the antennas so as to optimize in an adaptive fashion the receive characteristics of the array. By weighting and then summing the multiple antenna signals, the adaptive antenna array can adapt its angular response, sometimes called the array pattern, while it operates, in response to changes in the propagation environment. While operating, the adaptive antenna attempts to maximize the reception of the signal received from a desired transmitting device, while simultaneously minimizing the effects of all other unwanted interfering signals and noise. In a communication system, the interference suppression capability of an adaptive antenna array offers the potential to reduce co-channel interference, improve coverage quality, and increase overall system capacity.

Adaptive antenna arrays also offer the possibility of providing a new way of multiplexing multiple devices: Spatial Division Multiple Access (SDMA). With SDMA, multiple devices can simultaneously share the same channel (i.e., time, frequency, or code channel) and are separated and simultaneously decoded by the receiver array on the basis of their spatial position relative to the antenna array. When successfully deployed, SDMA promises to provide enormous increases in system capacity.

Spatial Division Multiple Access is a difficult technology to implement because of the rapidly-varying multipath fading channel. In an SDMA system, the devices that are sharing a channel provide interference to the receiver processing algorithms that must decode the signals transmitted by the devices. When a receiver processing algorithm attempts to decode one SDMA device, the other SDMA devices provide strong interference to the decoding algorithm. The adaptive antenna implementing SDMA suppresses the effects of the other devices when attempting to decode one of the transmitting devices.

A problem associated with employing both an equalizer and an adaptive antenna in a wireless communication system lies in the design of an algorithm and device having adequate ability to adapt to changes in the signal environment. Adaptive antennas that operate in a fast fading multipath environment must, for best performance adapt to the rapidly varying channel as well as to any changes in the nature of the desired and interfering signals. In a broadband system, a frequency selective multipath channel will cause significant variations in the channel across the occupied bandwidth of the received signal. Equalization and interference-suppression algorithms which cannot track these channel variations both in time and frequency will suffer significant degradation in performance as measured by the bit-error rate (BER) or signal-to-interference-plus-noise ratio (SINR).

A common ingredient in many equalizers and adaptive antenna arrays is an algorithm and device that estimates the characteristics of the multipath propagation environment, or channel transfer function, or channel frequency response, between the desired transmitting device and each of the plurality of receiving antennas at the communication receiver. When SDMA is being employed in a broadband system operating in a frequency-selective environment, then an adaptive antenna array generally requires an estimate of the channel frequency response between each receiving antenna and each of the transmitting devices that are simultaneously sending information to the array. The channel estimation algorithm in this case should operate to simultaneously solve for the channel responses of the multiple transmitting devices. Performing a simultaneous estimate of the channel responses of multiple transmitting devices is a difficult operation in a broadband communication system operating in a multipath-rich environment with high frequency selectivity. Strong interference caused by an SDMA deployment or a low reuse factor causes even more difficulty to the channel estimation algorithms. It would therefore be advantageous for a device to be able to compute an accurate channel frequency response estimate in the presence of SDMA interference and co-channel interference.

Given the need for higher system capacities in wireless communication systems, adaptive antennas and advanced equalization techniques are important for satisfying the ever-increasing need for high data rate communications. To support the operation of adaptive antennas and equalizers, it is advantageous to have a method and device that tracks the frequency response of a broadband system accurately to permit effective equalization and interference suppression. Given the difficulties associated with implementing SDMA and the deleterious nature of the multipath fading environment, it would be advantageous for a device to offer improved equalization and interference suppression performance in a broadband communication system.

Briefly described, the present invention is a method and device for first calculating the channel frequency responses of the signals transmitted by at least one transmitting device and received on at least one receive antenna, and then jointly equalizing the received signals, while simultaneously suppressing interference in a communication receiver, in order to recover the information transmitted by the device(s). In a highly frequency-selective propagation channel, the ability to accurately track the variations in the channel frequency response is critical to the proper operation of any equalization or interference suppression algorithm. The method and device of the present invention provide an improved technique for estimating the channel frequency response and then combining the outputs of the plurality of receiving antennas to suppress interference and equalize the received signals. The method and device of the present invention can be incorporated into a communications receiving device, base station, or subscriber unit. In the present invention, the term "device" can refer to any type of communications device such as a base station, subscriber unit, or other communications receiver or transmitter.

The present invention is implemented in a communication system where at least one desired transmitting device transmits information to a communication receiver having at least one antenna. In a preferred embodiment, a plurality of transmitting devices simultaneously transmit information to a communication receiver having a plurality of antennas. A transmitting device transmits its information in bursts that contain two components: a training interval and a data interval. The information transmitted in a training interval contains pilot symbol sequences of content and duration known by both the transmitting device and the communication receiver. The data interval contains data symbols that must be recovered at the receiving device. In the present invention, the term "burst" refers to any one of the following: a short or isolated transmission, a portion of a longer transmission, a portion of a continuous transmission, a portion of a semi-continuous transmission, a time-limited transmission, a bandwidth-limited transmission, or any combination thereof.

In a communication system, the present invention provides for a communication receiver that recovers the data symbols that are transmitted by at least one transmitting device. The present invention provides an improved technique for computing a channel transfer function (also referred to as "estimating the frequency response") of the propagation channel between each of the at least one transmitting device and each of the at least one receiving antenna. The frequency response estimates are then used to equalize the received signals so that a demodulating device at the communication receiver can recover the data symbols transmitted by the transmitting devices. If more than one antenna is present at the communication receiver, then the method and device of the present invention provide a means to simultaneously receive and recover the information transmitted simultaneously by more than one transmitting device. Also if more than one antenna is present at the communication receiver, then the method and device of the present invention provide the capability of suppressing the effects of unwanted interference transmitted by other users of the occupied bandwidth.

The method and device in accordance with the present invention provide accurate estimates of the channel frequency responses of the plurality of transmitting devices even in the case where multiple transmitting devices transmit information simultaneously on the same frequency channel. Furthermore, when more than one antenna is present at the receiving device, then the present invention provides for combining the outputs of the multiple receiving antennas so that the information bursts transmitted simultaneously by more than one transmitting device is recovered. In such a situation, the presence of multiple devices transmitting simultaneously provides a level of interference that will prevent a conventional receiver from simultaneously recovering all of the transmitted information bursts. However, the present invention provides for suppressing the effects of each of the interfering devices so that all of the information signals are jointly equalized and recovered. Moreover, when additional interference is transmitted to the receiving antennas by another unwanted transmitter in the occupied bandwidth, then the method and device of the present invention suppresses the effects of the unwanted transmitter.

There are several important advantages of the present invention. First, the ability to receive and recover the information transmitted simultaneously by more than one device significantly increases the capacity of the communication system. Conventional cellular systems permit only one device to transmit on a particular frequency channel within a cell for any predetermined time interval. Providing for more than one device to transmit to a base station on the same frequency channel at the same time will multiply the capacity of the system by a factor equal to the number of devices that are allowed to simultaneously transmit.

Second, the ability to suppress interference can also significantly increase overall capacity of a wide area cellular system by permitting the use of smaller reuse factors. Using smaller reuse factors in a cellular system generally increases the level of co-channel interference received by a communication receiver. Such interference prevents the error-free recovery of the transmitted signals within a cell. The present invention provides for suppressing the effects of co-channel interference. Wideband cellular systems implementing the method and device of the present invention increase the overall information carrying capacity of the wide-area communication system.

A preferred embodiment of the present invention described below typically operates in a low-mobility delay-spread channel and operates under the assumption that the channel changes rather slowly over time, but significantly over frequency. This assumption is appropriate in many wireless systems such as wireless local loop systems or wireless fixed access systems. If the information burst transmitted over the channel is adequately short in time, then this assumption is appropriate in many mobile wireless communication systems in addition to non-mobile wireless systems. If the channel changes appreciably over time, then the method and device of the present invention can be implemented in a way that tracks those changes with either decision-directed tracking techniques or with interpolation techniques, as will be described below.

FIG. 1, numeral 100, illustrates a wireless communication system in accordance with the preferred embodiment of the present invention. As shown in FIG. 1., a Base Station 110 provides communication service to a geographic region known as a cell 103. A plurality of User Devices 120 and 130 communicate with the Base Station 110. In some embodiments of the communication system of FIG. 1, a plurality of External Interference Sources 140 share the same spectrum allocated to the base station 110 and subscriber devices 120 and 130. The External Interference Sources 140 represent an unwanted source of emissions that interferes with the communication process between the Base Station 110 and the User Devices 120 and 130. The exact nature of the External Interference Sources 140 will depend on the specific embodiment of the communication system of FIG. 1. In some cases, as is shown in FIG. 1, an External Interference Source will be another User Device 140 (similar in construction and purpose to User Device 120) that is communicating with another Base Station 112 in the same frequency spectrum allocated to Base Station 110 and User Devices 120 and 130.

As shown in FIG. 1., User Devices 120 have a single antenna, while User Devices 130 have at least one antenna. The method and device of the present invention can be implemented as part of a Base Station 110 as well as part of a User Device 120 or 130. One of the features of the present invention is that devices (e.g., User Devices 130 and Base Station 110) constructed to have more than one antenna will have the ability to suppress the interference transmitted by an External Interfering Source 140 when receiving information from other devices (e.g., other User Devices 120 and 130 and Base Station 110). When implemented in a Base Station 110 or User Device 130, another feature of the present invention is that multiple User Devices 120 and 130 or Base Stations 110 can transmit simultaneously to the receiving device incorporating the invention, and the invention will allow the receiving device to recover the information transmitted simultaneously by the User Devices 120 or 130 or Base Station 110.

Figure 2:
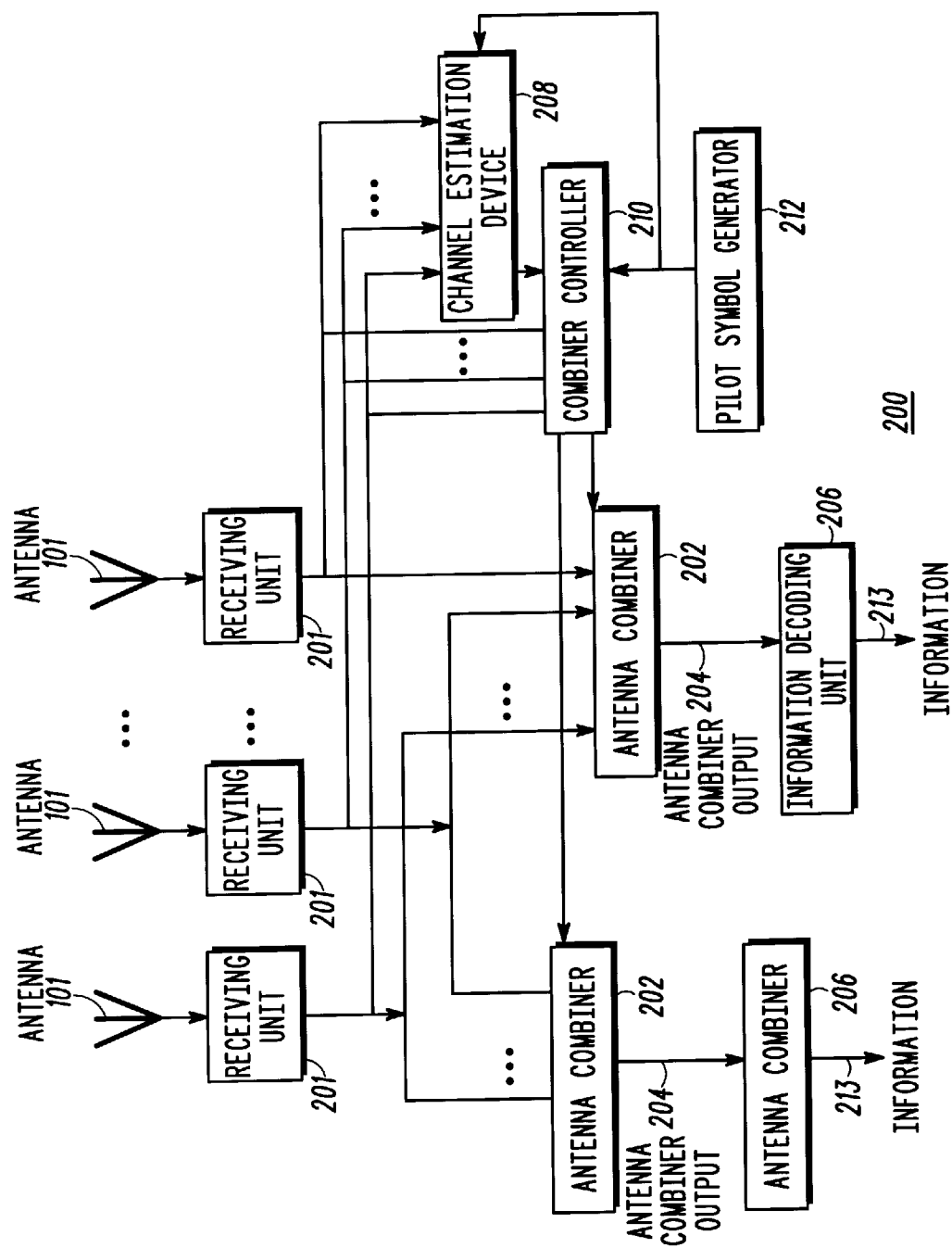
FIG. 2 is a block diagram illustrating a device in accordance with the present invention.

FIG. 2, numeral 200, is a block diagram illustrating a device in accordance with the present invention. The communication receiver in accordance with the present invention includes a plurality of antennas (101) wherein the outputs of the plurality of antennas are each provided to a receiving unit (201). The outputs of the receiving units (201) are provided to at least one Antenna Combiner (202). The signals from the receiving units (201) are also fed into the Combiner Controller (210), which regulates the operation of the at least one Antenna Combiner (202). The signals from the receiving units (201) are also fed into the Channel Estimation Device (208). The Pilot Symbol Generator (212) generates pilot symbol information that is used by the Combiner Controller (210) to control the Antenna Combiner (202). The pilot symbol information generated by the Pilot Symbol Generator (212) is also used by the Channel Estimation Device (208) to estimate the frequency responses of the transmitting devices (120, 130, 110, 112, or 140, or any combination thereof. The output of an Antenna Combiner (202) is fed into an Information Decoding Unit (206), which decodes the Antenna Combiner Output (204) and generates data information (213) that was received by the Antennas (101).

Figure 3:
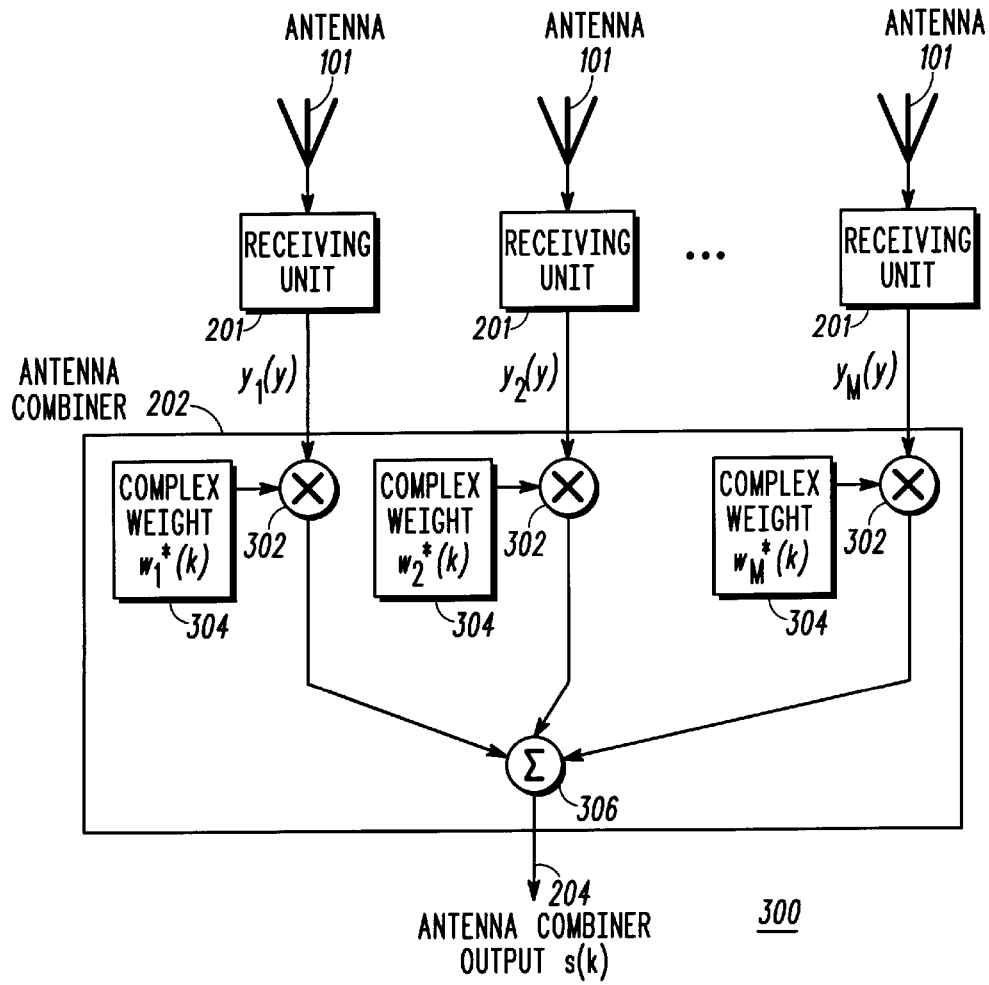
FIG. 3 is a block diagram illustrating details of the Antenna Combiner of the device of FIG. 2.

FIG. 3, numeral 300, is a block diagram illustrating details of the Antenna Combiner of the device of FIG. 2. Antenna Combiner (202) is coupled to the receiving units (201) which in turn are coupled to the antennas (101). In a preferred embodiment, the receiving units (201) may include radio frequency pre-amplifiers, filters, and other devices which can be used to convert the radio frequency signal received by the antenna down to a digital stream of baseband equivalent complex symbols. As shown in FIG. 2, the output of the i'th receiving unit (201) (where i is an integer between 1 and M inclusive, and M is the total number of antenna elements) is mathematically denoted by $y_i(k)$, where k and i are integers, and is provided to the antenna combiner (202) which can be in the form of a plurality of complex multipliers (302) which multiply the output of each receiving unit (201) by a complex weight (304), mathematically denoted as $w_i(k)$, and a combiner (306) sums the outputs of the plurality of complex multipliers (302). The values of the complex weights (304) are controlled by the Combiner Controller (210), shown in FIG. 2, which are described in more detail below.

Figure 4:
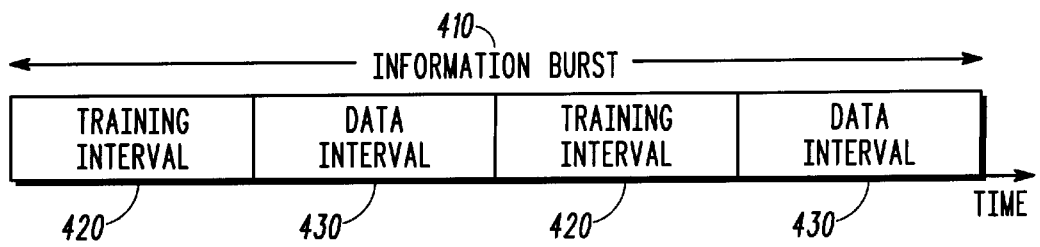
FIG. 4 is a timing diagram illustrating the structure of an Information Burst which can be used by the communication system in which the device in FIG. 2 operates.

FIG. 4., numeral 400, is a timing diagram illustrating the structure of an information burst (410) transmitted between a plurality of transmitting devices (e.g., Base station 110, User Device 120, or 130) and a receiving device (e.g., Base station 110, User Device 120, or 130). An information burst (410) includes at least one training interval (420) and at least one data interval (430). During a training interval (420), a transmitting device (e.g., a Base station 110, or a User Device 120, or a User Device 130, or a base station 112, or in some cases a User Device 140, or any combination thereof) transmit training information consisting of at least one pilot symbol of duration, content, and timing known to both the transmitting device and the receiving device (a Base station 110, or a User Device 120, or a User Device 130). As will be discussed below, the Channel Estimation Device (208) in the present invention uses the outputs of the receiving units (201) during at least one of the training intervals (420) and the knowledge of the transmitted sequence of pilot symbols to compute an estimate of the channel frequency response between the plurality of transmitting devices (a Base station 110 or 112, or a User Device 120, 130, or 140, or any combination thereof) and the antennas (101) of the receiving device. In another embodiment of the present invention, the signaling format is direct sequence spread spectrum, and the training intervals and the data intervals are transmitted simultaneously on separate spreading codes.

Figure 5:
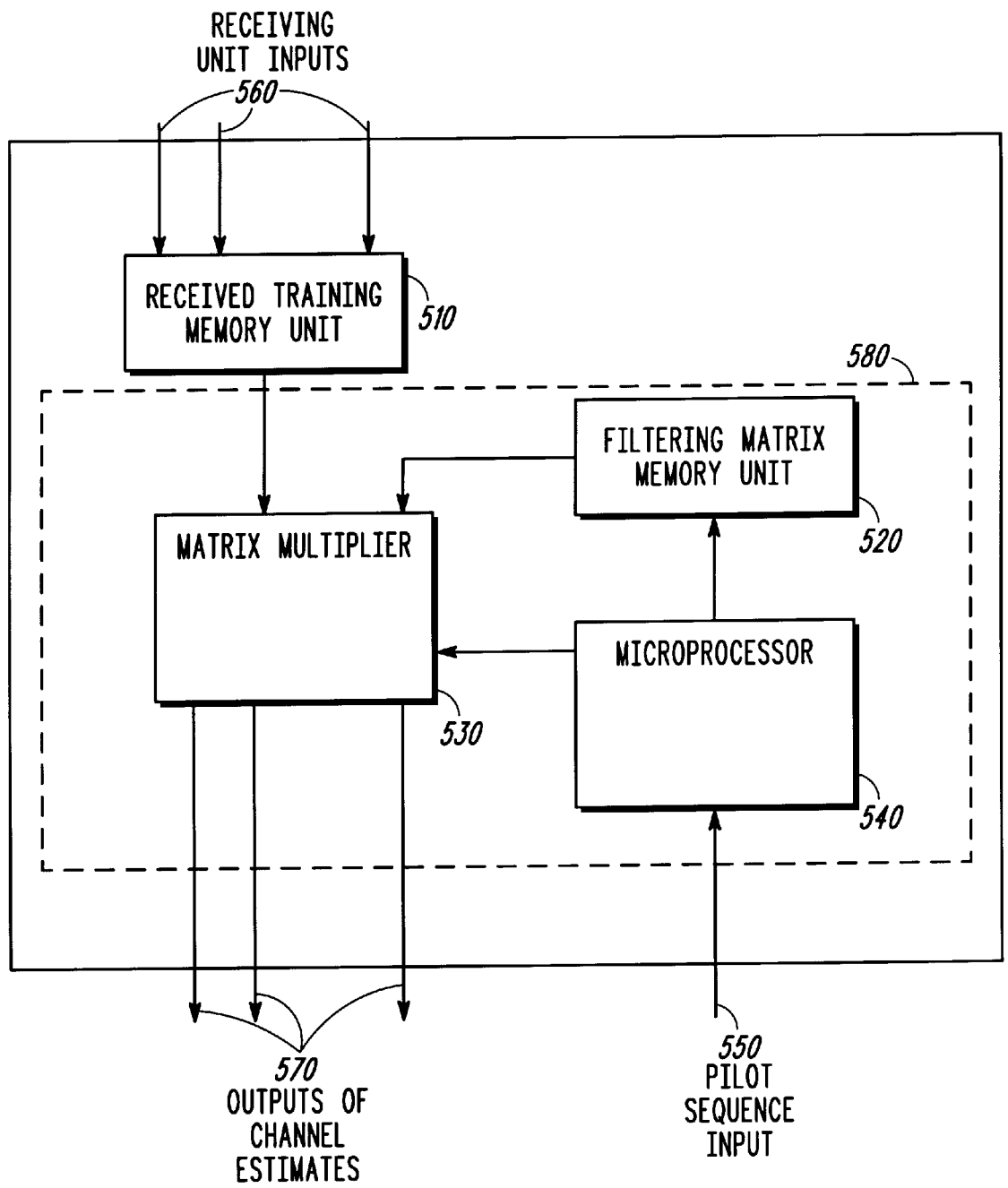
FIG. 5 is a block diagram illustrating details of the Channel Estimation Device of the device of FIG. 2.

FIG. 5, numeral 500, is a block diagram illustrating details of the Channel Estimation Device of the device of FIG. 2. A preferred embodiment of the Channel Estimation Device (208) includes a Received Training Memory unit (510) which stores the output signals from the Receiving Units (201) that were collected during at least one of the data intervals (430). A microprocessor (540) collects the pilot sequence information from the Pilot Sequence Input (550) and computes a Matrix of Filtering Coefficients to be stored in a Filtering Matrix Memory Unit (520). The process by which the Matrix of Filtering Coefficients is computed by the Microprocessor (540) will be described below. The received data stored in the Received Training Memory Unit 510 and the Matrix of Filtering Coefficients stored in the Filtering Matrix Memory Unit (520) are fed into a Matrix Multiplier (530) where they are multiplied, according to a process to be described below, to form the estimates of the channel response between the plurality of transmitting devices (a Base station 110, 112, or a User Device 120, 130, 140, or any combination thereof) and the receiving antennas (101) on the receiving device (a Base station 110, 112, or a User Device 120, 130, or 140). It is to be noted that the Filtering Matrix Memory Unit 520, the Matrix Multiplier (530), and the Microprocessor (540) are implemented in a processor 580.

A preferred embodiment for the present invention is a communications receiving device, base station, or subscriber unit operating in either a single carrier or a multi-carrier communication system such as Orthogonal Frequency Division Multiplexing (OFDM). The present invention can also be embodied in a communication receiving device, base station, or subscriber unit operating in a communication system employing direct sequence spread spectrum signaling.

Figure 6:
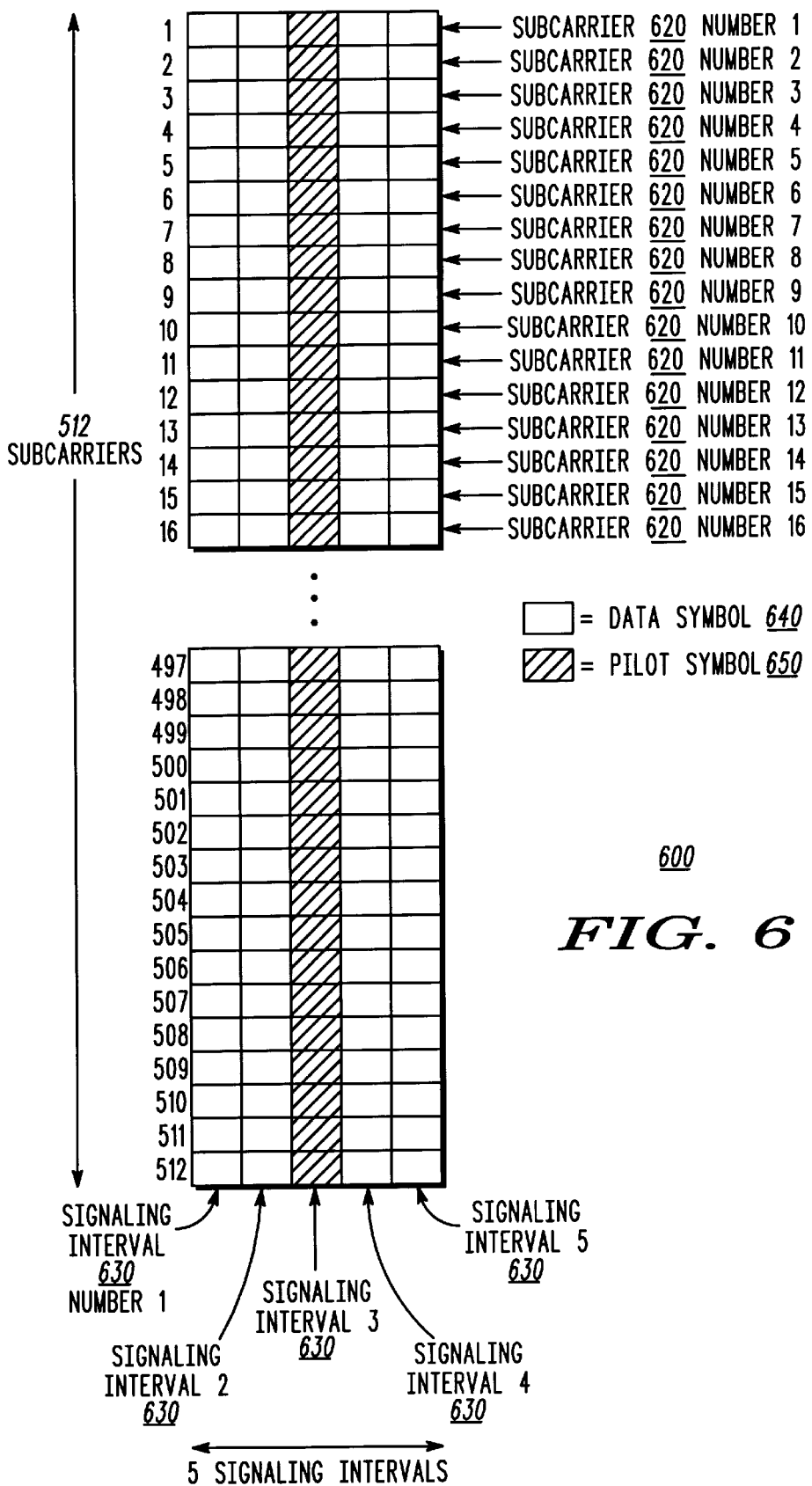
FIG. 6 is a representation of the structure of a time-frequency slot which can be used by the communication system in which the device in FIG. 2 operates.

In both multicarrier (such as OFDM) and single carrier systems, an information burst (410) can be referred to as a time-frequency slot. FIG. 6, numeral 600, is a representation of a preferred embodiment of the structure of a time-frequency slot utilized in a communication system in accordance with the present invention. Each time-frequency slot (610) consists of a portion of the time-frequency spectrum over which a particular transmitter transmits its information to the receiver. The signal transmitted in a time-frequency slot occupies a predetermined number of subcarriers (620) (also referred to as "frequency bins") in the frequency domain, and these subcarriers (620) are numbered between one and total number of subcarriers inclusive. The signal transmitted in a time-frequency slot also occupies a predetermined number of signaling intervals (630), numbered between one and the total number of signaling intervals inclusive.

Each information symbol contained in a time-frequency slot (610) is identified with a unique pair of numbers (k, b), where b is between 1 and the number of signaling intervals B inclusive, and k is between 1 and the number of subcarriers K in the time-frequency slot. The time-frequency slot of FIG. 6 shows a time-frequency slot that is 512 subcarriers long in frequency and 5 signaling intervals long in time, for a total of 2560 symbols. A group of adjacent pilot symbols in a time-frequency slot, such as the pilot symbols (650) is also called a pilot sequence. A pilot symbol or a group of pilot symbols can also be referred to as pilot data.

The demodulation process for one signaling interval (630) within a time-frequency slot (610) produces a plurality of information symbols, where each information symbol is either a Data Symbol (640) or a Pilot Symbol (650), and each information symbol corresponds to one of the subcarriers (620) of the system. The time-frequency slot will consist of either all or a pre-determined subset of the total number of subcarriers (620) received over a pre-determined number of signaling intervals (630). In a multicarrier system or an OFDM system, different transmitters can be assigned to different subcarriers within a particular signaling interval. However, in a single carrier system, a transmitter occupies the entire allocated bandwidth of the system.

In a single carrier system, the information symbols carried on the subcarriers (620) are a frequency-domain representation of the signal transmitted during a signaling interval (630) and can be produced by carrying out a Fast Fourier Transform (or another similar transform) of the time-waveform received during the signaling interval (630). To recover the original transmitted waveform, the information symbols generated on the subcarriers must be transformed back into the time-domain by a Inverse Fast Fourier Transform (or another similar transform).

In a multicarrier system, the information carried on the subcarriers are the actual information-bearing symbols that are demodulated to produce the information being transmitted by the transmitting device. Unlike a single carrier system, an Inverse Fast Fourier Transform (or similar transform) is not needed to recover the transmitted information.

In the time-frequency slot, the Data Symbols (640) are used to convey the user information, such as a voice signal or multimedia data traffic, that is being communicated to the receiver. The Pilot Symbols (650) are symbols known to both the transmitter and the receiver and are used by the receiver to aid in decoding the data symbols transmitted by the transmitter. Other than assisting in reliably maintaining the communication link, pilot symbols generally contain no user information and, therefore, represent a portion of the channel capacity that cannot be used for transmitting user information.

In a time-frequency slot (610), at least one transmitter is assigned to transmit its data symbols and pilot symbols to the receiver. If more than one transmitter is assigned to transmit to the receiver in a time-frequency slot, then an access technique called Spatial Division Multiple Access (SDMA) is used by the receiver. The present invention allows the communication receiver to receive and separate the signals transmitted by the multiple transmitters sharing the same time-frequency slot.

Figure 7:
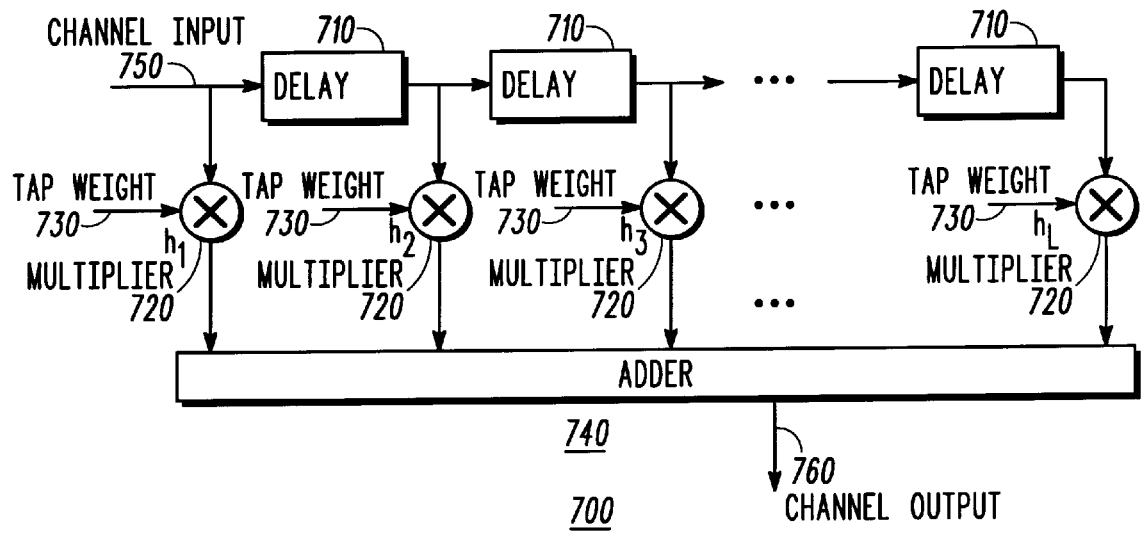
FIG. 7 is a block diagram illustrating the details of the Channel Model Filter which is used for mathematically modeling the operation of the Channel Estimation Device of the device of FIG. 2.

To aid in the understanding of how the Channel Estimation Device (208) computes the channel frequency response, the following presents a mathematical model of the channel between a plurality of transmitting devices and the plurality of receiving antennas on a receiving device. To estimate the frequency response of a plurality of transmitting devices, the Channel Estimation Device (208) of the invention operates such that the multipath propagation channel between a transmitting device and a receive antenna can be mathematically modeled as a tapped-delay line filter, denoted as the channel model filter, having a complex weight at each tap. FIG. 7, numeral 700, is a block diagram illustrating the details of the Channel Model Filter which is used for mathematically modeling the operation of the Channel Estimation Device of the device of FIG. 2. As shown in FIG. 7, the Channel Input (750) to the Channel Model Filter passes to a delay line comprised of L tap weights (730) and L-2 Delay elements (710), where L is an integer greater than zero. The signal at the input to each Delay element (710) is multiplied by a Tap Weight (730) with a multiplier (720), and then the outputs of all multipliers (720) are added together by an Adder (740) to form the Channel output (760). (The collection of Tap Weights (730) are generally referred to as a channel modeling sequence.)

In a preferred embodiment of the present invention, the number and time spacing of the taps of the Channel Model Filter of FIG. 7 are chosen so that the length of the impulse response of the Channel Model Filter is equal to at least the maximum anticipated differential delay of the propagation channel in which the invention is expected to operate.

The present invention provides for storing a copy of the pilot sequence sent by each of the transmitting devices, and computing a set of complex tap weights (730) of the channel model filter that provide the best linear fit between the training signals of each transmitting device and the signals received at the outputs of the receiving antennas during the training interval. A distinct set of complex tap weights (730) is computed for each combination of transmitting device and receiving antenna. Once the complex tap weights (730) of the model filter are computed for each transmitting device and each receiving antenna, the frequency response of the channel between a transmitting device and a receiving antenna is computed as the Fast Fourier Transform (or other similar transform) of the mathematical impulse response of the model filter having the computed complex tap weights.

One of the advantages of the present invention is that it eliminates the need to perform a separate estimation of the value of the frequency response at every frequency location (or bin) within the bandwidth of operation. The present invention operates under the assumption that any channel impulse response can be adequately approximated by the impulse response of the channel modeling filter of FIG. 7. By estimating the values of the tap weights (730) in the channel modeling filter, the entire frequency response can be determined without having to separately estimate the frequency response at every frequency bin. The present invention provides an accurate frequency response estimate because there are far fewer unknown tap weights (730) to be estimated than there are frequency bins at which the frequency response must be estimated. Therefore, the present invention has lower complexity than a method that separately estimates the frequency response at each frequency bin. The present invention has an additional advantage in that it provides a method for jointly estimating the frequency response between multiple simultaneously transmitting devices and each of at least one antenna.

These mathematical steps of the algorithm for computing the channel response can be captured in a matrix of filtering coefficients that can be computed upon device initialization given knowledge of the plurality of pilot sequences that will be transmitted during a training interval. To compute the channel frequency responses between each of the transmitting devices and each of the plurality of receiving antennas, the information received during the training interval is multiplied by the matrix of filtering coefficients.

To further aid in the understanding of the invention, an alternate, but equivalent, description of the mathematical modeling according to the operation of the invention is as follows. Instead of modeling the frequency-selective channel as a tapped-delay line filter, the frequency response of the frequency-selective channel to be estimated by the Channel Estimation Device (208) can be approximated as a weighted sum of a number of predetermined basis functions. In another embodiment, the basis functions are Discrete Fourier Transform (DFT) exponential functions, although the method of the invention could provide for another set of basis functions. The algorithm used in this embodiment of the invention as described herein estimates a set of gain and phase weights associated with each basis function of the assumed frequency domain channel transfer function model. The gain and phase weight for each basis function is computed based on knowledge of the pilot sequences transmitted by each of the desired transmitting devices during the training interval. The channel frequency response can then be computed to be the weighted sum of the basis functions where each basis function is multiplied by its associated gain and phase weights.

When the basis functions used in the mathematical modeling are DFT exponential functions, estimating the set of gain and phase weights associated with each DFT exponential function is equivalent to estimating a set of sample values of the impulse response of the frequency selective channel. The channel frequency response can then be computed as the DFT of the calculated set of gain and phase weights.

As with the previously described tapped-delay line model, the mathematical steps of this alternate description can be captured in a matrix of filtering coefficients, which in many cases can be computed upon device initialization. When multiplied by the data received during the training interval, the matrix of filtering coefficients will produce the frequency response estimates of the plurality of desired transmitting devices at each of the plurality of antenna outputs at the receiving device.

To aid in the understanding of the operation of the invention, a mathematical description of the present invention is now presented. In the following, the variable M is an integer used to represent the number of antenna outputs used by the present invention. The variable J designates the number of desired transmitting devices whose channel transfer functions are to be estimated. The variable L is an integer that designates the number of basis functions (e.g., taps of the channel model filter) whose associated gain and phase will be estimated so that the channel transfer function can be computed. The variable k designates the frequency subcarrier number.

The frequency domain channel transfer function between antenna output m and transmitting device i is modeled as:

$$H_{i,m}(k) = \sum_{l=1}^{L} h_{i,m}(l) f_l(k) \qquad (1)$$

Where $h_{i,m}(l)$ is the complex gain and phase for basis function l and $f_l(k)$ is basis function l (in a preferred embodiment, $f_l(k)=\exp(-j*2*\pi*k*l/N)$ which corresponds to the DFT exponential function where N is the DFT sample size). (An additional example of a basis function is $f_l(k)=k^l$ which is commonly used in polynomial approximation and interpolation problems.)

The desired transmitting device i's channel transfer function for each of the M antenna outputs can be stacked into a M×1 vector $H_i(k)$ as follows:

$$H_i(k) = \sum_{l=1}^{L} h_i(l) f_l(k) \qquad (2)$$

where $h_i(e)=[h_{i,1}(l), h_{i,2}(l), \ldots, h_{i,M}(l)]^T$ where T represents the matrix transpose operator.

The received data for antenna output m at time t on subcarrier k is given as $Y_m(k,t)$, and the M×1 vector $Y(k,t)$ is defined to be $Y(k,t)=[Y_1(k,t), Y_2(k,t), \ldots, Y_M(k,t)]^T$.

The complex gain and phase vector for each transmitting device on each antenna output is found through the following minimization problem:

$$\min_{\substack{h_i(l) \\ i=1\ldots J \\ l=1\ldots L}} \sum_{q=1}^{J} \sum_{l} \sum_{k} \left| H_q(k) - \left( \frac{Y(k,t) - \sum_{\substack{j=1 \\ j\neq q}}^{J} H_j(k) x_j(k,t)}{x_q(k,t)} \right) \right|^2 \qquad (3)$$

Where the summation over t and the summation over k means to sum at all times t and subcarriers k where there is a training signal $x_i(k,t)$ for desired transmitting device i. Substituting equation (2) into equation (3), the minimization problem of equation (3) becomes:

$$\min_{\substack{h_i(l) \\ i=1\ldots J \\ l=1\ldots L}} \qquad (4)$$

$$\sum_{q=1}^{J} \sum_{l} \sum_{k} \left| \sum_{l=1}^{L} h_q(l) f_l(k) - \left( \frac{Y(k,t) - \sum_{\substack{j=1 \\ j\neq q}}^{J} \sum_{l=1}^{L} h_j(l) f_l(k) x_j(k,t)}{x_q(k,t)} \right) \right|^2$$

The solution to this minimization can be written in one of two forms both corresponding to a matrix-vector multiplication between a matrix of filtering coefficients and the received data $Y_m(k,t)$. The first form (equation (5) below) estimates the complex gain and phase associated with each basis function and desired transmitting device directly and then the frequency domain channel transfer function is found for each desired transmitting device using equation (2). The second form (equation (6) below) finds the estimates of the channel transfer function for each desired transmitting device on each subcarrier of interest (the subcarriers where the channel transfer function estimate is found may or may not have pilots signals transmitted on them). It is advantageous to use the first form when the basis functions are chosen as DFT coefficients, because it is less computationally complex to find the frequency domain channel transfer function by first finding the complex gain and phase associated with each basis function and then performing a Fast Fourier Transform. It is advantageous to use the second form when the frequency domain channel transfer function needs to be estimated only on some subset of the subcarriers. The two forms are expressed as:

$$\Psi = TY \qquad (5)$$

$$H = UY \qquad (6)$$

where $$\Psi = \begin{bmatrix} h_1^T(1) \\ \vdots \\ h_1^T(L) \\ h_2^T(1) \\ \vdots \\ h_2^T(L) \\ \vdots \\ h_J^T(1) \\ \vdots \\ h_J^T(L) \end{bmatrix} (JL \times M) \quad H = \begin{bmatrix} H_1^T(k_1) \\ \vdots \\ H_1^T(k_K) \\ H_2^T(k_1) \\ \vdots \\ H_2^T(k_K) \\ \vdots \\ H_J^T(k_1) \\ \vdots \\ H_J^T(k_K) \end{bmatrix} (JK \times M) \quad (7)$$

K is the number of subcarriers of interest and $\{k_1, k_2, \ldots, k_K\}$ is the set of subcarriers of interest. The Matrix Y is given as:

$$Y = \begin{bmatrix} Y^T(\Gamma_{1,min}, t_1) \\ \vdots \\ Y^T(\Gamma_{1,max}, t_1) \\ Y^T(\Gamma_{2,min}, t_2) \\ \vdots \\ Y^T(\Gamma_{2,max}, t_2) \\ \vdots \\ Y^T(\Gamma_{\tau,min}, t_\tau) \\ \vdots \\ Y^T(\Gamma_{\tau,max}, t_\tau) \end{bmatrix} (N_T \times M) \quad (8)$$

where $N_T$ is the total number of training symbols available for processing for a single desired transmitting device, $\{t_1, t_2, \ldots, t_\tau\}$ are the set of times where there is a pilot, $\tau$ is the number of time samples, $\Gamma_l$ is the set of subcarriers where there is a pilot at time $t_l$, $\Gamma_{l,min}$ is the smallest subcarrier where there is a pilot at time $t_l$, and $\Gamma_{l,max}$ is the largest subcarrier where there is a pilot at time $t_l$.

The matrices T ($JL \times N_T$) and U ($JK \times N_T$) of equations (5) and (6) and all of the matrices needed to form T and U are defined as follows:

$$T = R^{-1} V_x \quad (9)$$

$$U = FR^{-1} V_x \quad (10)$$

$$R = \begin{bmatrix} Q_{11} & Q_{12} & Q_{13} & \cdots & Q_{1J} \\ Q_{21} & Q_{22} & Q_{23} & \cdots & Q_{2J} \\ Q_{31} & Q_{32} & Q_{33} & \cdots & Q_{3J} \\ \vdots & & & \ddots & \vdots \\ Q_{J1} & Q_{J2} & Q_{J3} & \cdots & Q_{JJ} \end{bmatrix} (JL \times JL) \quad (11)$$

$$Q_{ij} = \begin{bmatrix} v_{ij}(1,1) & v_{ij}(1,2) & \cdots & v_{ij}(1,L) \\ v_{ij}(2,1) & v_{ij}(2,2) & \cdots & v_{ij}(2,L) \\ \vdots & & \ddots & \vdots \\ v_{ij}(L,1) & v_{ij}(L,2) & \cdots & v_{ij}(L,L) \end{bmatrix} (L \times L) \quad (12)$$

$$v_{ij}(n,m) = \sum_t \sum_k \frac{x_j(k,b)}{x_i(k,b)} f_n^*(k) f_m(k) \quad (13)$$

$$F = \begin{bmatrix} F_s & 0 & \cdots & 0 \\ 0 & F_s & \ddots & \vdots \\ \vdots & \ddots & \ddots & 0 \\ 0 & \cdots & 0 & F_s \end{bmatrix} (JK \times JL) \quad (14)$$

$$V_x = \begin{bmatrix} VX_1 \\ VX_2 \\ \vdots \\ VX_J \end{bmatrix} (JL \times N_T) \quad (15)$$

$$F_s = \begin{bmatrix} f_1(k_1) & f_2(k_1) & \cdots & f_L(k_1) \\ f_1(k_2) & f_2(k_2) & \cdots & f_L(k_2) \\ \vdots & \vdots & \ddots & \vdots \\ f_1(k_K) & f_2(k_K) & \cdots & f_L(k_K) \end{bmatrix} (K \times L) \quad (16)$$

$$X_j = diag\left( \frac{1}{x_j(\Gamma_{1,min}, t_1)}, \ldots \frac{1}{x_j(\Gamma_{1,max}, t_1)}, \frac{1}{x_j(\Gamma_{2,min}, t_2)}, \right.$$
$$\left. \ldots \frac{1}{x_j(\Gamma_{2,max}, t_2)}, \ldots \frac{1}{x_j(\Gamma_{\tau,min}, t_\tau)}, \ldots, \frac{1}{x_j(\Gamma_{\tau,max}, t_\tau)} \right) \quad (17)$$

$$V = \begin{bmatrix} v_1 \\ v_2 \\ \vdots \\ v_L \end{bmatrix} (L \times N_T) \quad (18)$$

$$v_n = [f_n^*(\Gamma_{1,min}), \ldots, f_n^*(\Gamma_{1,max}), f_n^*(\Gamma_{2,min}), \\ \ldots, f_n^*(\Gamma_{2,max}), \ldots, f_n^*(\Gamma_{\tau,min}), \ldots, f_n^*(\Gamma_{\tau,max})] \quad (19)$$

As has been described, a way of finding the channel transfer function in a preferred embodiment is to perform the minimization of equation (3). In another embodiment, the channel transfer functions can be found through the following different minimization problem:

$$\min_{\substack{h_i(l) \\ i=1\ldots J \\ l=1\ldots L}} \sum_t \sum_k \left| Y(k,t) - \sum_{j=1}^J \sum_{l=1}^L h_j(l) f_l(k) x_j(k,t) \right|^2 \quad (20)$$

The solution to the minimization in equation (20) is the same solution as given in equations (5) and (6) with the exceptions of $v_{ij}(n,m)$ and $X_j$ which are as follows:

$$v_{ij}(n,m) = \sum_t \sum_k x_i^*(k,t) x_j(k,t) f_n^*(k) f_m(k) \quad (21)$$

$$X_j = [x_j^*(\Gamma_{1,min}, t_1), \ldots, x_j^*(\Gamma_{1,max}, t_1), x_j^*(\Gamma_{2,min}, t_2), \\ \ldots x_j^*(\Gamma_{2,max}, t_2), \ldots, x_j^*(\Gamma_{\tau,min}, t_\tau), \ldots, x_j^*(\Gamma_{\tau,max}, t_\tau)] \quad (22)$$

The advantage the minimization problem of equation (20) has over the one presented in equation (3) is that there is no division operation by the pilot symbols which could present numerical problems if one or more of the pilot symbols is close to zero in magnitude.

Note that U is a $JK \times N_T$ matrix and thus its size is not a function of L (however, the entries of U will be a function of L). Therefore when the frequency responses for each of the desired transmitting devices are computed, the number of operations does not depend on the value of L. Also, the matrix U depends only on the known pilot signals and not on the received data. Hence, if the pilot signals do not change as the device operates, then U needs to be computed only once upon device initialization.

Figure 8:
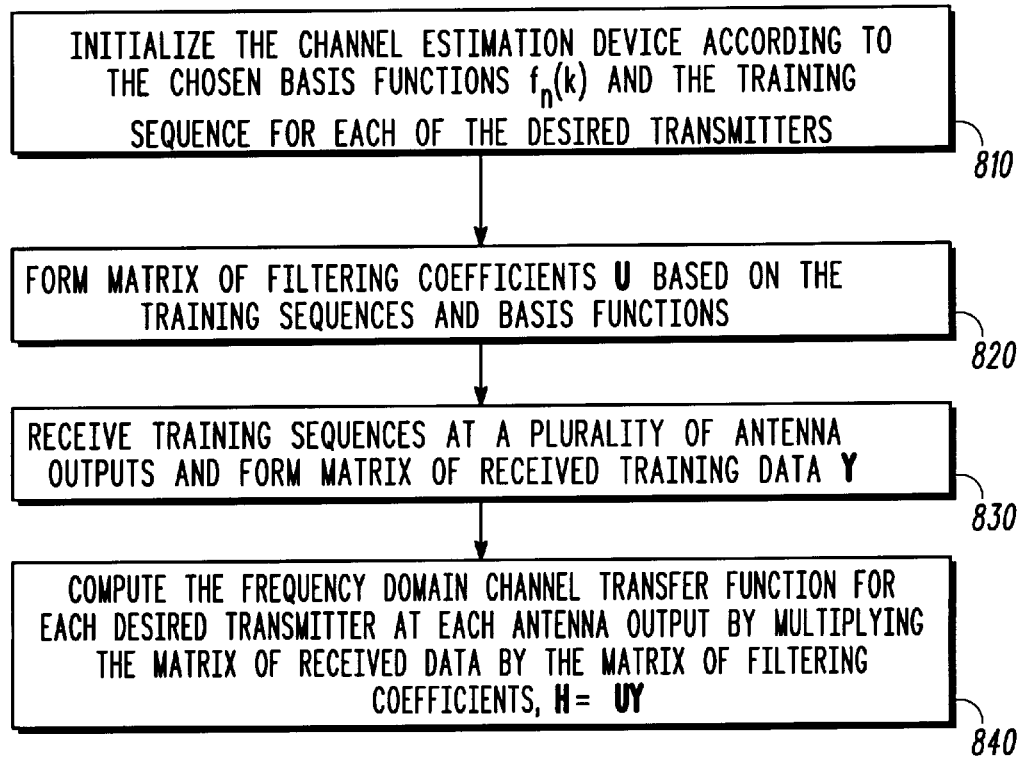
FIG. 8 is a flow chart representation of steps of a method performed by a preferred embodiment of the Channel Estimation Device of FIG. 5 to provide channel estimates between a transmitting device and a receiving antenna in accordance with the present invention.

FIG. 8 is a flow chart representation of steps of a method performed by a preferred embodiment of the Channel Estimation Device of FIG. 5 to provide channel estimates between a transmitting device and a receiving antenna in accordance with the present invention. The first step, block 810, is to initialize the Channel Estimation Device of the present invention based on the choice of basis functions, $f_n(k)$, being used in the mathematical model for the channel response. In the preferred embodiment, $f_n(k)$ is chosen to be the Discrete Fourier Transform coefficients. Also in block 810, the device is initialized according to the training sequences being used by each of the desired transmitters. Then using the basis functions and the training sequences specified in the initialization step of block 810, the matrix of filtering coefficients, U, is formed in block 820 in accordance with equation (10). The matrix of filtering coefficients is stored and need not be recomputed as long as the training sequences for each desired transmitter do not change. Next, in block 830, the plurality of antenna outputs receives the signals from the desired transmitters and forms the matrix of received training data Y. Finally, in block 840, the frequency domain channel transfer function estimates are computed by multiplying the matrix of received training data by the matrix of filtering coefficients in accordance with equation (6).

Figure 9:
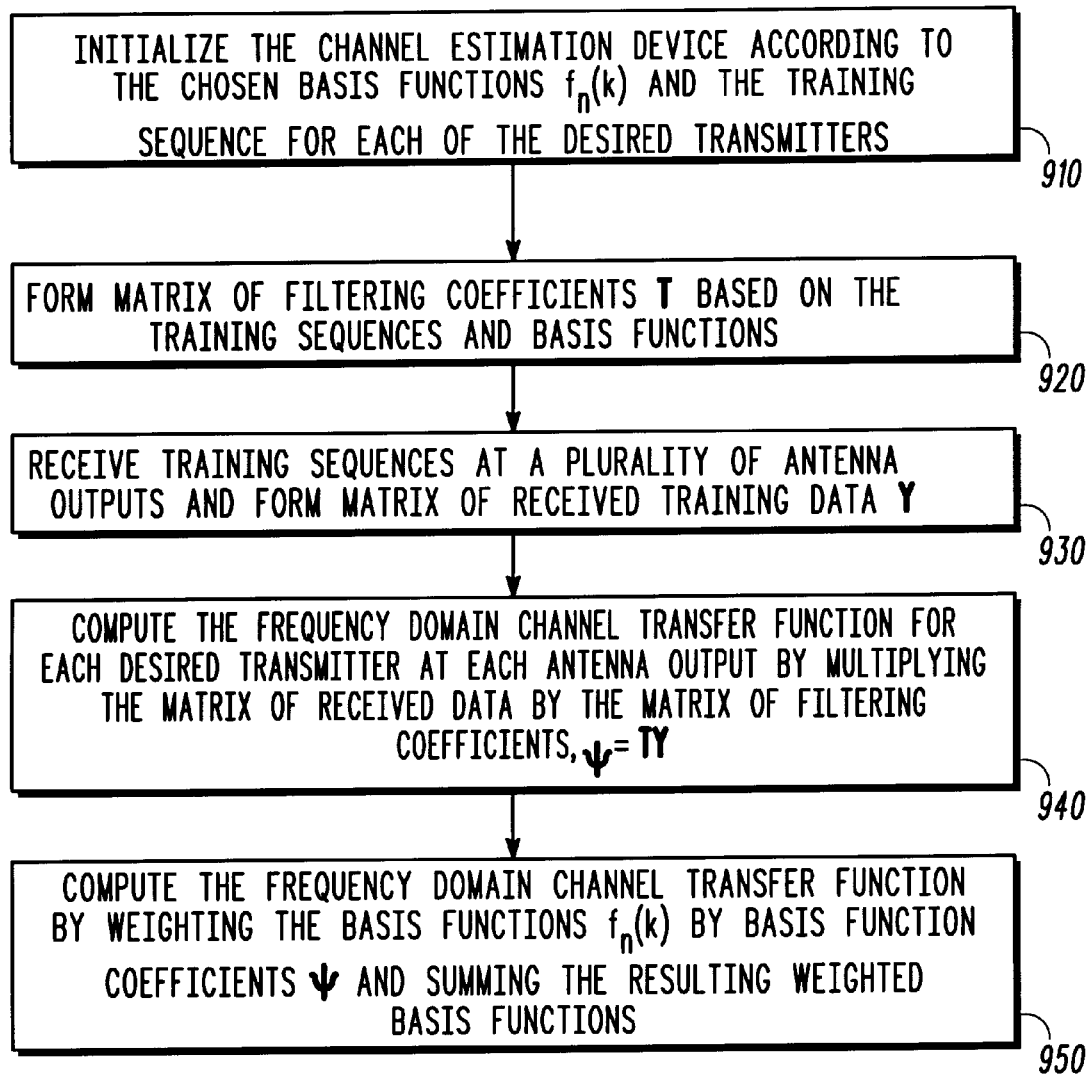
FIG. 9 is a flow chart representation of steps of another method performed by another embodiment of the Channel Estimation Device of FIG. 5 to provide channel estimates between a transmitting device and a receiving antenna in accordance with the present invention.

FIG. 9 is a flow chart representation of steps of another method performed by another embodiment of the Channel Estimation Device of FIG. 5 to provide channel estimates between a transmitting device and a receiving antenna in accordance with the present invention. The first step, block 910, is to initialize the Channel Estimation Device of the present invention based on the choice of basis functions, $f_n(k)$, being used in the mathematical model for the channel response. Also in block 910, the device is initialized according to the training sequences being used by each of the desired transmitters. Then using the basis functions and the training sequences specified in the initialization step of 910, the matrix of filtering coefficients, T, is formed in block 920 in accordance with equation (9). The matrix of filtering coefficients is stored and need not be recomputed as long as the training sequences for each desired transmitter does not change. Next, in block 930, the plurality of antenna outputs receives the signals from the desired transmitters and forms the matrix of received training data Y. Then the basis function coefficients, $\Psi$, are computed by multiplying the matrix of received training data by the matrix of filtering coefficients in accordance with equation (5), as shown in block 940. Finally the basis function coefficients are processed to compute the frequency domain channel transfer function, as shown in block 950.

Given knowledge of the frequency responses of each transmitting device as computed according to the steps described above, the present invention provides for the equalization of the received signal. If more than one antenna is present, then the invention combines the outputs of the multiple antennas to simultaneously equalize the received signals and suppress interference. A description of the steps of the method and device for combining the antenna outputs is provided below.

The present invention provides for combining the outputs of a plurality of receiving antennas for recovering the information transmitted by the desired transmitting devices. The antenna combiner (202), shown in FIG. 2, computes multiple combined output signals from the outputs of the plurality of receiving antennas. One combined output signal (204) is formed for each desired transmitting device that the receiver wishes to recover. Each output signal is then demodulated by a demodulation device or Information Decoding Unit (206) to recover the information signals transmitted by the corresponding desired transmitting device.

The antenna combiner operates by having potentially different combining weights on each frequency subcarrier and at different times. In order to optimally receive the desired transmitting devices, the combining weights must change in time and frequency because the channel transfer functions will vary in time and frequency across the bandwidth of the transmitted signals. The channel estimates computed according to the present invention are used to track the variations in frequency and in time and thus permit computation of more effective combining weights. The present invention contemplates two embodiments of the combining weights, namely Partial Reconstruction combining weights and Full Reconstruction combining weights. The term Reconstruction refers to reconstructing the spatial covariance matrix of each signal at each subcarrier and time and then using these spatial covariance matrices to compute the optimal combining weights (optimal means in the minimum mean squared error sense) that separate the desired signals and also equalize (i.e., demodulate) them. As further explained below, a preferred embodiment of the present invention uses the Partial Reconstruction method when it is anticipated that no sources of external interference (140) are present on the channel. When it is anticipated that external interference (140) may be present on the channel, then a preferred embodiment of the present invention uses the Full Reconstruction method.

The Partial Reconstruction combining weights are best when there is little or no external interference sources, where an external interference source is a transmitting device that transmits a signal during the training interval of which the receiver has no knowledge. The combining weights are computed by reconstructing a set of spatial covariance matrices for all known desired signals plus the receiver-generated noise signal on each subcarrier and time of interest. These spatial covariance matrices are all summed together to form the total spatial covariance matrix. Then the combining weights for a desired transmitter are computed by multiplying the inverse of the total spatial covariance matrix at a given subcarrier and time by the channel transfer function estimate of the same desired transmitter at the same subcarrier and time. Finally the equalized (i.e., demodulated) signal on a set of subcarriers and times for a desired transmitter is computed by applying the combing weights for the desired transmitter to the received signal on the antenna outputs on the same set of subcarriers and times.

When there is significant external interference, the preferred embodiment for computing the combining weights is the Full Reconstruction combining method. In this method, the channel transfer function estimates are used to estimate the external interference plus noise by subtracting out the estimated contribution associated with each of the known transmitting devices from the received pilot data on each antenna output. This estimate of the external interference plus noise signal on each antenna output is used to compute an instantaneous (i.e., on each frequency and time in which there is a pilot) external interference plus noise spatial covariance matrix. The instantaneous external interference plus noise spatial covariance matrices are then averaged over a block of time and frequency to compute a matrix which is referred to as the external interference plus noise spatial covariance matrix. Note that the external interference plus noise spatial covariance matrix will potentially change for different blocks of subcarriers and times depending on how the averaging is done.

Using the channel transfer function estimates on each subcarrier and time as well as this interference plus noise spatial covariance matrix, combining weights are computed.

This is done by reconstructing the total spatial covariance matrix as the sum of the spatial covariance matrices of all known desired signals plus the external interference plus noise spatial covariance matrix. The total spatial covariance matrix is estimated on each subcarrier and time of interest. The combining weights for a desired transmitter are computed by multiplying the inverse of the total spatial covariance matrix at a given subcarrier and time by the channel transfer function estimate of the same desired transmitter at the same subcarrier and time. Finally the equalized (i.e., demodulated) signal on a set of subcarriers and times for a desired transmitter is computed by applying the combing weights for that desired transmitter to the received signal on the antenna outputs on the same set of subcarriers and times.

It should be noted that in order to compute Full Reconstruction combining weights for equalizing and suppressing interference, accurate estimates of the channel transfer functions are needed so that part of the desired signal is not suppressed. Without the channel transfer function estimation in accordance with the present invention, the prior art channel transfer function estimates would not be accurate enough to allow the estimates of the known transmitted signals to be subtracted from the received data at each antenna output in order to estimate the external interference plus noise. Without the method and device of the present invention, inaccurate channel estimates would result in a portion of the desired transmitted signals remaining after the subtraction process, and thus a portion of the desired signal would be suppressed by the Full Reconstruction combining weights. In other words, the part of the desired signal that remained in the antenna output signals after the subtraction process would be treated as external interference and would be suppressed by the combining weights.

The Partial and Full Reconstruction combining weights computations are further described below.

Figure 10:
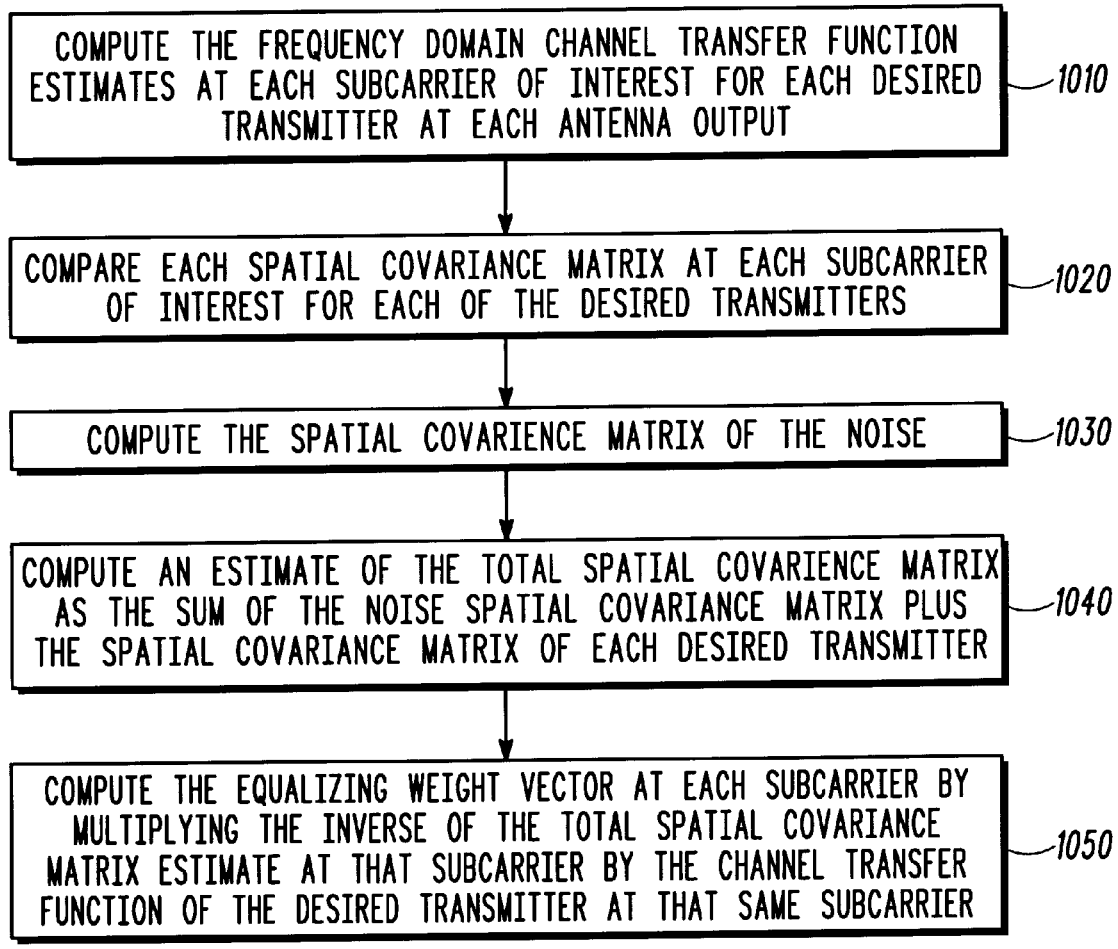
FIG. 10 is a flow chart representation of steps of a method performed by the Combiner Controller in FIG. 2 for computing the combining weights in the antenna combiner of FIG. 3. in accordance with the Partial Reconstruction approach of the present invention for equalizing the received signal and suppressing interference.

FIG. 10, numeral 1000, shows the steps taken for finding the Partial Reconstruction combining weights. The first step is for the Channel Estimation Device (208) to compute the frequency domain channel transfer function estimates at each subcarrier and time in which there is a pilot symbol (that is, at each subcarrier of interest), as shown in block 1010. These estimates are then used to compute the spatial covariance matrix of each desired transmitter at each subcarrier and time of interest, as shown in 1020. These spatial covariance matrices are called "reconstructed covariance matrices." Next, in block 1030, the estimate of the noise spatial covariance matrix is formed (in the preferred embodiment the noise spatial covariance matrix is computed to be an estimate of the receiver thermal noise power in the antenna output signals multiplied by an M×M identity matrix), and then the total spatial covariance matrix is estimated as the sum of the noise spatial covariance matrix plus the reconstructed spatial covariance matrices from each desired transmitter, as shown in block 1040. Finally, in block 1050, the combining weights for each desired transmitting device are computed as the inverse of the total spatial covariance matrix at each subcarrier and time of interest multiplied by the desired transmitter's frequency domain channel transfer function at the same subcarrier and time.

Figure 11:
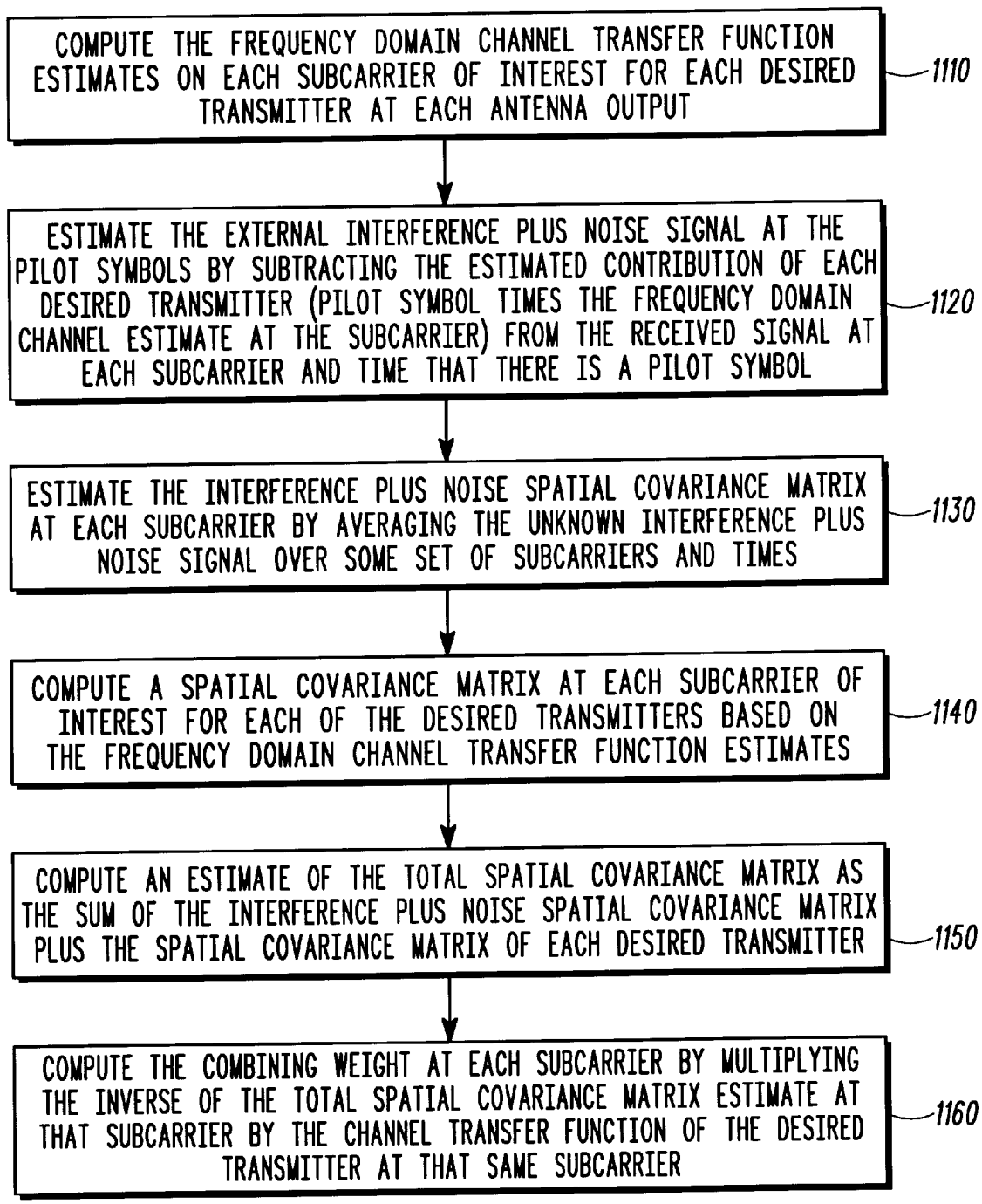
FIG. 11 is a flow chart representation of steps of a method performed by the Combiner Controller in FIG. 2 for computing the combining weights in the antenna combiner of FIG. 3. in accordance with the Full Reconstruction approach of the present invention for equalizing the received signal and suppressing interference.

FIG. 11, numeral 1100, shows the steps taken for finding the Full Reconstruction method combining weights. The first step is to compute the frequency domain channel transfer function estimates at each subcarrier and time there is a pilot symbol, as shown in block 1110. Next an estimate of the external interference plus noise signal is computed at each subcarrier and time that there is a pilot symbol by subtracting out an estimate of the desired transmitters signals. The estimate of the desired transmitter signals is formed by multiplying the desired device's pilot symbol by the estimated frequency domain channel transfer function estimate. The estimates of the external interference plus noise signals are then averaged in block 1130 over a predetermined block of subcarriers and times to compute an estimate of the external interference plus noise spatial covariance matrix at each subcarrier and time. Next the frequency domain channel transfer function estimates are used to compute the spatial covariance matrix of each desired transmitter at each subcarrier of interest, as shown in block 1140. (These spatial covariance matrices of each desired transmitter are called "reconstructed spatial covariance matrices." Then, in block 1150, the total spatial covariance matrix is estimated as the sum of the external interference plus noise spatial covariance matrix plus the reconstructed spatial covariance matrices for each desired transmitter. Finally, in block 1160, the combining weights for each desired transmitting device are computed as the inverse of the total spatial covariance matrix at each subcarrier and time of interest multiplied by the desired transmitter's frequency domain channel transfer function at the same subcarrier and time. The aforementioned combining weights will equalize the desired transmitting device's signal while suppressing interference.

To further aid in the understanding of the operation of the combing weights, a computational explanation is provided below. In the following, the variable M is an integer used to represent the number of antenna outputs used by the present invention. The variable J designates the number of desired transmitting devices whose pilots are known by the receiving device. The variable k designates the frequency subcarrier number.

The channel transfer function estimates for each desired transmitter on each subcarrier can be used to find weights that cancel out known interference and possibly external (unknown) interference. The first type of combining weights assumes there is no external interference and is called the Partial Reconstruction combining weights. The term "reconstruction" refers to the technique of "reconstructing" the optimal combining equations using the channel transfer function estimates of the desired transmitting devices. The weight vector for desired transmitter j on subcarrier k at one particular time is given by:

$$w_j(k) = \left\{ \sum_{i=1}^{J} H_i(k) H_i^H(k) + \sigma_n^2 I \right\}^{-1} H_j(k) \quad (23)$$

where $H_j(k)$ is the M×1 channel transfer function on subcarrier k for desired transmitter j, $\sigma_n^2$ is the estimated receiver thermal noise power on each antenna element, and the superscript H is the matrix Hermitian transpose operation. The term $\sigma_n^2 I$ is referred to as the noise covariance matrix. Equation (23) is the solution to the following minimization problem $$\min_{w_j(k)} E \left| w_j^H(k) \left[ \sum_{i=1}^{J} H_i(k) x_i(k, t) + n(k) \right] - x_j(k, t) \right|^2 \quad (24)$$

where n(k) is a vector of the receiver noise signals present on the antennas, and $x_j(k,t)$ is the known pilot symbol at the $k^{th}$ subcarrier in signaling interval t.

When external interference is a problem, an estimate of the external interference plus noise spatial covariance matrix can be found on the pilot symbols. This is done by subtracting out each of the estimated signals associated with the desired transmitters from the received signal vector at each pilot symbol by using the desired signals' channel transfer functions and the known pilot symbols. What is left is an estimate of the received external interference plus noise at each pilot symbol. This remaining signal is referred to as $X_e(k,t)$ and has the following form:

$$x_e(k,t) = Y(k,t) - \sum_{j=1}^{J} H_j(k)x_j(k,t) \qquad (25)$$

where Y(k,t) is a M×1 vector of the received pilot data at subcarrier k and time t (the vector is formed by stacking the received pilot data at each antenna output) and $x_j(k,t)$ is the known pilot symbol transmitted by desired transmitter j at subcarrier k and time t.

The external interference plus noise spatial covariance matrix, $R_e$, can then be found by averaging this over a certain number of pilots:

$$R_e = \text{average}(x_e(k,t)x_e^H(k,t)) \qquad (26)$$

where average means to average what is inside the parentheses over some number of subcarriers k and times t.

The combining weights that are a function of $R_e$ will be referred to as the Full Reconstruction combining weights and the weight for desired transmitter j on subcarrier k at one particular time instance is given by:

$$w_j(k) = \left\{ \sum_{i=1}^{J} H_i(k)H_i^H(k) + R_e \right\}^{-1} H_j(k) \qquad (27)$$

It is to be noted that $R_e$ can be a function of subcarrier k and time t, and in order to best track the unknown interference, $R_e$ will need to change (in the preferred embodiment in a block fashion) across frequency subcarriers and time. Also note that equation (27) is the solution to the following minimization problem:

$$\min_{w_j(k)} E \left| w_j^H(k) \left[ \sum_{i=1}^{J} H_i(k)x_i(k,t) \right] - x_j(k,t) \right|^2 + w_j^H(k)R_e w_j(k), \qquad (28)$$

where $R_e$ is given by equation (26).

For either Partial or Full Reconstruction used to find the combining weights, a computational explanation of the combining operation is now presented. Note that the combining weights only need to be computed at subcarriers and times that there are data symbols. The combining weights, $w_j(k)$, computed for desired transmitter j at a particular time, t, are used in conjunction with the received antenna outputs in vector form Y(k,t) at the same time instance, t, and subcarriers as $w_j(k)$. The combining operation output, $s_j(k,t)$ for a single subcarrier and desired transmitter j at time t is then given as:

$$s_j(k,t) = w_j^H(k)Y(k,t) \qquad (29)$$

The combining operation is repeated for each desired transmitter j. The output for each desired transmitting device would then be input into the information decoding unit (206) or any other suitable demodulation device. For a multi-carrier communication system, $s_j(k,t)$ would be the demodulation device output for desired transmitting device j. For a single carrier communication system, $s_j(k,t)$ would be transformed back into the time domain to form a block of time domain equalized symbols. In a single carrier modulation system, time t would refer to a block of symbols that are transformed into the frequency domain by an FFT or similar transform. (The size of the block of symbols would correspond to the size of the Fast Fourier Transform (FFT).) An Inverse Fast Fourier Transform (IFFT) would then need to be performed on all subcarriers of $s_j(k,t)$ at one time block t to form the time domain demodulated symbols for the block of symbols at time t. In another embodiment, the communication system is a direct sequence spread spectrum communication system. For this embodiment, the direct sequence spread spectrum signal would be sampled at the chip rate and a training sequence spread by the spreading code would be used to find the channel transfer function estimates and combining weights in the same manner as a single carrier communication system.

The present invention further provides for aspects for estimating the channel transfer function at times and subcarriers where there is no pilot. The first aspect, the channel interpolation approach, provides a mathematical best fit of the channel transfer function estimates computed where there are pilot symbols to estimate the channel transfer function for times and subcarriers with data symbols. The second aspect, the decision-directed approach, demodulates a group of the symbols where there is no pilot using combining weights computed using the channel transfer function estimates found on the group of pilots. Next these symbol estimates are used as new pilots and new estimates of the channel transfer functions are computed at the times and subcarriers of these symbols. Next the new channel transfer function estimates are used to compute combining weights used to demodulate the next group of symbols. This process would then repeat until the next block of pilot symbols is encountered.

The interpolation approach of finding channel estimates at times and subcarriers where there is no pilot operates is as follows. First, the channel transfer function estimates are computed for the times and subcarriers associated with the received pilot symbols. For times and subcarriers where there is no pilot, a type of mathematical interpolation, as is known in the art, can be performed to estimate the channel transfer function at those times and subcarriers. In one aspect, pilot symbols are sent on all subcarriers at times 0 and N. Then the channel transfer function estimate is found on all subcarriers for the pilots at time 0 and a second channel transfer function estimate is found on all subcarriers for the pilots at time N. Next, a best fit polynomial of degree m fit (e.g., a best line fit, m=2) is performed at each subcarrier to find the channel transfer function at all subcarriers at times 1 through N−1. The best fit channel transfer function estimates are then used to find combining weights at subcarriers and times there is data. Another embodiment of interpolation uses a linear filter with predetermined tap weights to perform the interpolation.

For clarity of describing the decision-directed approach, it is assumed that a group of pilots is sent on all subcarriers spanning the bandwidth of the transmitted signal at time 0 and then data is sent on all subcarriers at subsequent times until time N where the next group of pilots is sent. The first step is to estimate the channel transfer function on all subcarriers for the group of pilots at time 0. These channel transfer function estimates are then used to find combining weights that are then used to demodulate the symbols on all subcarriers sent at time 1. This demodulated block of symbols at time 1 is then used as 'pilot' symbols to calculate an updated channel transfer function on all subcarriers at time 1. The amount of the memory in the channel transfer function update algorithm can be selected according to the expected rate of channel variations and the expected accuracy of the decisions. Then these new channel transfer function estimates are used to find combining weights that are then used to demodulate the symbols on all subcarriers at time 2. This process proceeds until the group of pilots at time N is reached or all of the transmitted data has been received (i.e., there is no more data to be transmitted).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

We claim:

1. In a communication system including a receiver having at least one receiving antenna for receiving at least one information burst transmitted by at least one transmitting device where the information burst contains a number of data symbols and a pilot symbol sequence of content known at both the at least one transmitting device and the receiver, a method for computing a channel transfer function between the at least one transmitting device and the at least one receiving antenna, comprising the steps of:

A) computing a simulated received pilot signal for at least one receiving antenna that is based on the pilot symbol sequence, a channel modeling sequence, and a set of predetermined basis functions;

B) computing an error signal between the simulated received pilot signal and the received pilot symbol sequence, wherein the error signal is based on the channel modeling sequence and the set of predetermined basis functions;

C) computing the channel modeling sequence, wherein a power of the error signal is minimized; and D) computing the channel transfer function by weighting the predetermined basis functions in response to the channel modeling sequence, wherein the power of the error signal is minimized.

2. The method of claim 1, wherein the channel transfer function is computed as a Fourier transform of the channel modeling sequence and the predetermined basis functions are basis functions of the Discrete Fourier Transform.

3. The method of claim 1, wherein a plurality of transmitting devices transmit information bursts simultaneously and wherein corresponding channel transfer functions are concurrently computed.

4. The method of claim 1, wherein the basis functions are a set of polynomials.

5. The method of claim 1, wherein the communication system is a Multicarrier communication system.

6. The method of claim 1, wherein the communication system is an Orthogonal Frequency Division Multiplexing system.

7. The method of claim 1, wherein the communication system is a Single Carrier system.

8. In a communication system including a receiver having at least one receiving antenna for receiving at least one information burst transmitted by at least one transmitting device where the information burst contains a number of data symbols and a pilot symbol sequence of content known at both the at least one transmitting device and the receiver, a method for computing a channel transfer function between the at least one transmitting device and the at least one receiving antenna, comprising the steps of:

A) solving a minimization formula according to:

$$\min_{\substack{h_i(l) \\ i=1\ldots J \\ l=1\ldots L}} \sum_{q=1}^{J} \sum_{t} \sum_{k} \left| \sum_{l=1}^{L} h_q(l) f_l(k) - \left( \frac{Y(k,t) - \sum_{\substack{j=1 \\ j \neq q}}^{J} \sum_{l=1}^{L} h_j(l) f_l(k) x_j(k,t)}{x_q(k,t)} \right) \right|^2$$

wherein Y(k,t) represents a vector of output signals of the at least one receiving antenna, $x_j(k,t)$ represents a pilot symbol, $h_j(l)$ represents a component of a channel modeling sequence, $f_l(k)$ represents a basis function; and B) computing the channel transfer function between the at least one transmitting device and the at least one receiving antenna according to:

$$H_i(k) = \sum_{l=1}^{L} h_i(l) f_l(k)$$

wherein $h_i(l)$ is equal to the solution of the minimization function of step.

9. In a communication system including a receiver having at least one receiving antenna for receiving at least one information burst transmitted by at least one transmitting device where the information burst contains a number of data symbols and a pilot symbol sequence of content known at both the at least one transmitting device and the receiver, a method for computing a channel transfer function between the at least one transmitting device and the at least one receiving antenna, comprising the steps of:

A) solving a minimization formula according to:

$$\min_{\substack{h_i(l) \\ i=1\ldots J \\ l=1\ldots L}} \sum_{t} \sum_{k} \left| Y(k,t) - \sum_{j=1}^{J} \sum_{l=1}^{L} h_j(l) f_l(k) x_j(k,t) \right|^2$$

wherein Y(k,t) represents a vector of output signals of the at least one receiving antenna, $x_j(k,t)$ represents a pilot symbol, $h_j(l)$ represents a component of a channel modeling sequence, $f_l(k)$ represents a basis function; and B) computing the channel transfer function between the at least one transmitting device and the at least one receiving antenna according to:

$$H_i(k) = \sum_{l=1}^{L} h_i(l) f_l(k)$$

wherein $h_i(l)$ is equal to the solution of the minimization function of step.

10. In a communication system including a plurality of receiving antennas, having a plurality of outputs, for receiving at least one information burst transmitted by at least one transmitting device where the information burst contains a predetermined number of data symbols, a method for combining the outputs of the plurality of receiving antennas to produce at least one combined output signal for recovering the at least one information burst transmitted by the at least one transmitting device, comprising the steps of:

A) computing for the at least one transmitting device at each of the receiving antennas at least one channel transfer function;

B) computing for the at least one transmitting device at least one spatial covariance matrix based on the at least one channel transfer function at each of the receiving antennas; and C) computing for the at least one transmitting device at least one combined output signal based on the outputs of the plurality of receiving antennas and based on the at least one channel transfer function and the at least one spatial covariance matrix for the at least one transmitting device.

11. The method of claim 10, wherein the communication system transmits/receives information bursts on a plurality of transmitting frequencies.

12. The method of claim 10, wherein the step of computing for the at least one transmitting device at least one combined output signal further comprises the steps of:

A) computing a total spatial covariance matrix as a sum of a noise covariance matrix plus the at least one spatial covariance matrix for the at least one transmitting device;

B) computing an inverse of the total spatial covariance matrix;

C) computing at least one combining weight vector by multiplying the inverse of the total spatial covariance matrix by the channel transfer function of the at least one transmitting device; and D) forming the combined output signal of the at least one transmitting device by multiplying the combining weight vector by the outputs of the plurality of receiving antennas in accordance with:

$$s_j(k,t)=w_j^H(k)Y(k,t).$$

13. The method of claim 10, wherein the step of computing for the at least one transmitting device at least one combined output signal further comprises the steps of:

A) computing a combining weight vector for the at least one transmitting device according to the following equation:

$$w_j(k) = \left\{\sum_{i=1}^{J} H_i(k)H_i^H(k) + \sigma_n^2 I\right\}^{-1} H_j(k)$$

wherein $H_i(k)$ represents a vector of channel transfer functions for each of the plurality of receiving antennas, $\sigma_n^2$ represents a noise power estimate, and I represents an identity matrix; and B) multiplying the combining weight vector by a vector comprised of the outputs of the plurality of receiving antennas to form the combined output signal in accordance with:

$$s_j(k,t)=w_j^H(k)Y(k,t).$$

14. The method of claim 10, wherein the step of computing for the at least one transmitting device at least one combined output signal further comprises the steps of:

A) computing a combining weight vector according to the following minimization formula:

$$\min_{w_j(k)} E\left|w_j^H(k)\left[\sum_{i=1}^{J} H_i(k)x_i(k,t) + n(k)\right] - x_j(k,t)\right|^2$$

wherein $H_i(k)$ represents a vector of channel transfer functions for each of the plurality of receiving antennas, n(k) represents a vector of noise signals, $x_j(k,t)$ represents a pilot symbol, and E represents an expectation operator; and B) multiplying the combining weight vector by a vector comprised of the outputs of the plurality of receiving antennas to form the combined output signal in accordance with:

$$s_j(k,t)=w_j^H(k)Y(k,t)$$

wherein Y(k,t) represents a vector of output signals of the plurality of receiving antennas.

15. In a communication system including a receiver having a plurality of receiving antennas for receiving at least one information burst transmitted by at least one transmitting device where the information burst contains a number of data symbols and a pilot symbol sequence of content known at both the at least one transmitting device and the receiver, a method for combining the outputs of the plurality of receiving antennas to produce at least one combined output signal for recovering the at least one information burst transmitted by the at least one transmitting device, comprising the steps of:

A) computing for the at least one transmitting device at each of the receiving antennas at least one channel transfer function;

B) computing for the at least one transmitting device at least one spatial covariance matrix based on the at least one channel transfer function at each of the receiving antennas;

C) computing for the at least one transmitting device an intermediate signal estimate based on the at least one channel transfer function and the pilot symbol sequence transmitted by the at least one transmitting device;

D) forming an external interference plus noise signal for each of the receiving antennas by subtracting the intermediate signal estimate of the at least one transmitting device from the output of the receiving antennas;

E) forming an external interference plus noise spatial covariance matrix based on the external interference plus noise signal; and F) computing for the at least one transmitting device at least one combined output signal based on the outputs of the plurality of receiving antennas and based on the at least one channel transfer function, the at least one spatial covariance matrix for the at least one transmitting device, and the external interference plus noise spatial covariance matrix.

16. The method of claim 15, wherein the communication system transmits and receives information on a plurality of transmitting frequencies.

17. The method of claim 15, wherein step (D) is performed according to the following equation:

$$x_e(k,t) = Y(k,t) - \sum_{j=1}^{J} H_j(k)x_j(k,t)$$

wherein Y(k,t) represents a vector of output signals of the plurality of receiving antennas, $H_j(k)$ represents a vector of channel transfer functions for each of the plurality of receiving antennas $x_j(k,t)$ represents a pilot symbol.

18. The method of claim 17, wherein step (E) is performed according to the following equation:

$$R_e = \text{average}(x_e(k,t)x_e^H(k,t)).$$

19. The method of claim 18, wherein step (F) further comprises the steps of:

A) solving for a combining weight vector according to:

$$w_j(k) = \left\{\sum_{i=1}^{J} H_i(k)H_i^H(k) + R_e\right\}^{-1} H_j(k); \text{ and}$$

B) multiplying the combining weight vector by a vector comprised of the outputs of the plurality of receiving antennas to form the combined output signal in accordance with:

$$s_j(k,t) = w_j^H(k)Y(k,t).$$

20. In a communication system including a receiver having a plurality of receiving antennas for receiving at least one information burst transmitted by at least one transmitting device where the information burst contains a number of data symbols and a pilot symbol sequence of content known at both the at least one transmitting device and the receiver, a method for combining the outputs of the plurality of receiving antennas to produce at least one combined output signal for recovering the at least one information burst transmitted by the at least one transmitting device, comprising the steps of:

A) computing for the at least one transmitting device at each of the receiving antennas at least one channel transfer function;

B) computing an external interference plus noise signal for each of the receiving antennas according to:

$$x_e(k,t) = Y(k,t) - \sum_{j=1}^{J} H_j(k)x_l(k,t)$$

wherein Y(k,t) represents a vector of output signals of the plurality of receiving antennas, $H_l(k)$ represents the at least one channel transfer function for each of the plurality of receiving antennas $x_j(k,t)$ represents a pilot symbol;

C) computing an external interference plus noise spatial covariance matrix according to:

$$R_e = \text{average } (x_e(k,t)x_e^H(k,t));$$

D) computing a combining weight vector by solving the following minimization formula:

$$\min_{w_j(k)} E\left|w_j^H(k)\left[\sum_{i=1}^{J} H_l(k)x_i(k,t)\right] - x_j(k,t)\right|^2 + w_j^H(k)R_e w_j(k); \text{ and}$$

E) multiplying the combining weight vector by a vector comprised of the outputs of the plurality of receiving antennas to form the combined output signal in accordance with:

$$s_j(k,t) = w_j^H(k)Y(k,t).$$

21. The method of claim 1, wherein the steps of the method are embodied in a Digital Signal Processor, DSP, that has been programmed with said steps.

22. The method of claim 1, wherein the steps of the method are embodied in an Application Specific Integrated Circuit, ASIC, arranged to provide said steps.

23. The method of claim 1, wherein the steps of the method are embodied in a gate array that has been arranged to provide said steps.

24. The method of claim 1 wherein the steps of the method are stored in a memory.

25. The method of claim 10, wherein the steps of the method are embodied in a Digital Signal Processor, DSP, that has been programmed with said steps.

26. The method of claim 10, wherein the steps of the method are embodied in an Application Specific Integrated Circuit, ASIC, arranged to provide said steps.

27. The method of claim 10, wherein the steps of the method are embodied in a gate array that has been arranged to provide said steps.

28. The method of claim 10, wherein the steps of the method are stored in a memory.

29. The method of claim 15, wherein the steps of the method are embodied in a Digital Signal Processor, DSP, that has been programmed with said steps.

30. The method of claim 15, wherein the steps of the method are embodied in an Application Specific Integrated Circuit, ASIC, arranged to provide said steps.

31. The method of claim 15, wherein the steps of the method are embodied in a gate array that has been arranged to provide said steps.

32. The method of claim 15, wherein the steps of the method are stored in a memory.

33. A base station/subscriber unit having a receiver for computing a channel transfer function for at least one transmitting device, comprising:

a plurality of receiving antennas for receiving at least one information burst transmitted by at least one transmitting device where the information burst contains a number of data symbols and a pilot symbol sequence of content known at both the at least one transmitting device and the receiver, a processor for computing a simulated received pilot signal for each receiving antenna, wherein the simulated received pilot signal is based on the pilot symbol sequence, a channel modeling sequence, and a set of predetermined basis functions, and wherein the processor computes an error signal as a function of the simulated received pilot signal and the received pilot symbol sequence, wherein the processor computes the channel modeling sequence, wherein the power of the error signal is minimized, and wherein the processor computes the channel transfer function by weighting the predetermined basis functions by the channel modeling sequence.

* * * * *